May 10, 1966 A. R. SHAPIRO 3,250,126
CLINICAL THERMOMETER
Filed Nov. 29, 1963
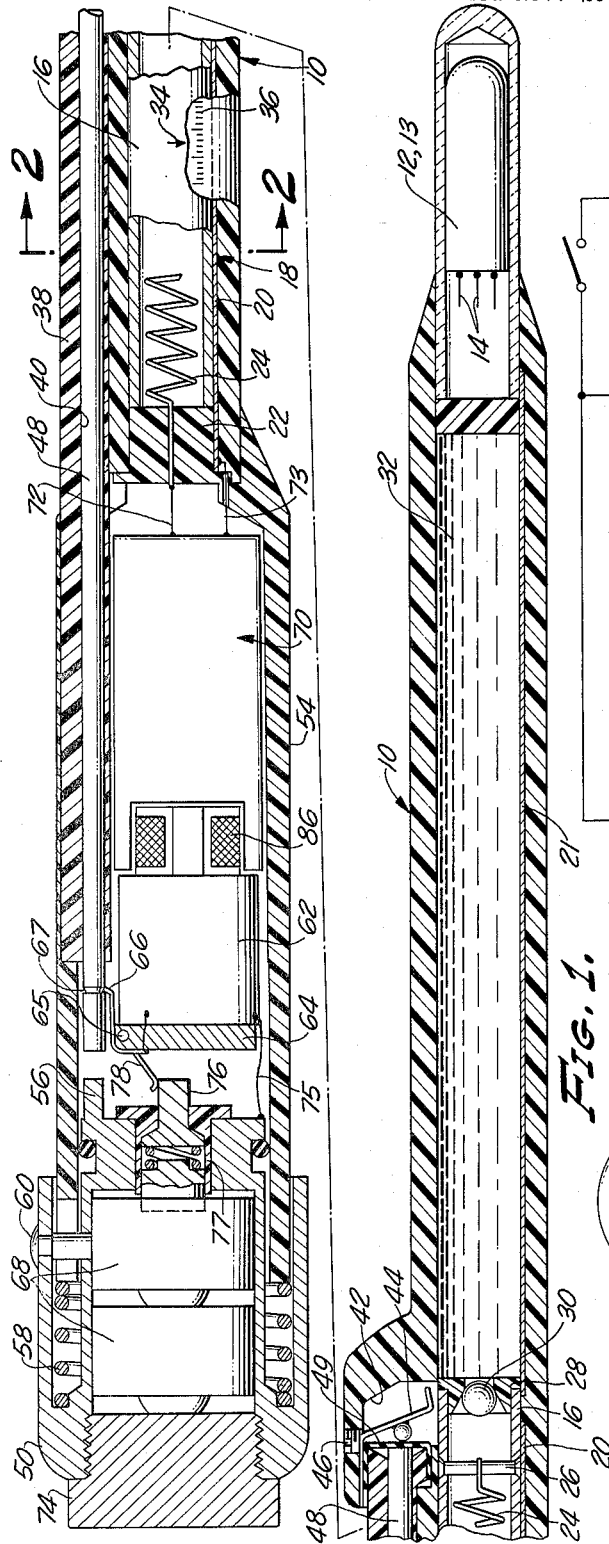
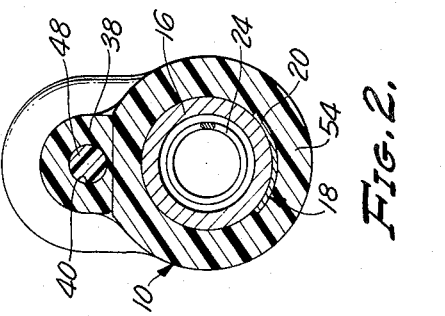
INVENTOR.
ALAN R. SHAPIRO
BY
*Lyon+Lyon*
ATTORNEYS United States Patent Office 3,250,126
Patented May 10, 1966

3,250,126
CLINICAL THERMOMETER
Alan R. Shapiro, Riverside, Calif., assignor to Highland Research Corporation, Riverside, Calif., a corporation of California
Filed Nov. 29, 1963, Ser. No. 326,881
18 Claims. (Cl. 73—362)

This invention relates to a temperature measuring device and more particularly relates to an electronically operated clinical thermometer.

Clinical thermometers presently used for determining the body temperature of human beings are of the familiar mercury-in-glass type. These thermometers have several obvious disadvantages, e.g., they are extremely fragile and difficult to read accurately. This type of thermometer also changes its calibration with time. Perhaps their greatest disadvantage, however, is the time interval, generally on the order of several minutes, that it takes for the mercury of a thermometer of this type to establish its final level. This necessary time interval is very inconvenient when taking the temperatures of various classes of patients, for example, those with nasal obstructions and infants. Moreover, in hospitals or the like, the time of the doctor or nurse taking the temperature is generally wasted during this interval and thus the number of patients they can see is reduced.

According to the present invention, a clinical thermometer is provided which gives substantially an instantaneous temperature reading. This is accomplished by using a temperature sensitive transducer to sense the body temperature of the patient. The transducer is connected in an electrical circuit, preferably a bridge circuit, and the circuit is further provided with a movable balancing member for indicating the temperature when the circuit is balanced. The circuitry of the present invention is completely solid state and thus is durable, dependable, and requires little operating power. The present thermometer need be no larger than those presently available and thus may be used in the same manner.

It is, therefore, an object of the present invention to provide an accurate, quick-reading clinical thermometer, which is more durable than those heretofore known.

It is also an object of the present invention to provide such a thermometer having a temperature sensitive element and a movable element connected in an electrical circuit, the movable element operable to indicate the temperature sensed by the temperature sensitive element.

It is another object of the present invention to provide such a thermometer in which the temperature sensitive element is mounted in good thermal contact in the bottom of a thin tube and the movable element moves from a start position to an indicating position to balance a bridge circuit in which both elements are connected.

These and other objects and advantages of the present invention will become more apparent upon reference to the accompanying description and drawings, in which:

FIGURE 1 is a side elevation, partly in section, of the thermometer of the present invention;

FIGURE 2 is a view taken along lines 2—2 of FIGURE 1; and

FIGURE 3 is a schematic diagram of an electrical circuit suitable for use in the thermometer of the present invention.

Referring now to FIGURES 1 and 2, there is shown a clinical thermometer constructed in accordance with the present invention. A transparent tube 10, preferably of a transparent plastic, has a pair of ferroelectric capacitors 12 and 13 mounted in its lower end. The ferroelectric capacitor 12 is preferably made with its Curie temperature about 50° C. below body temperature in order to obtain a sensitivity of minus 1% per degree Fahrenheit within the range of 94° F. to 106° F. The capacitor 13 is preferably made with its Curie temperature above body temperature in order to obtain a sensitivity of plus 1% per degree Fahrenheit within the range of 94° F. to 106° F.

The capacitor 12 may be provided with this characteristic by properly firing a composition of 30 percent strontium titanate and 70 percent barium titanate while the capacitor 13 may be provided with its desired characteristic by properly firing a composition of 15 percent strontium titanate and 85 percent barium titanate. Electrical leads 14 from the capacitors 12 and 13 are connected to the electrical circuitry to be later described and preferably are embedded in the wall of the tube 10.

A cylindrical sleeve 16 which forms one plate of a coaxial, split-stator, variable plate capacitor 18 is movably mounted within the interior of the tube 10. The stationary plates 20 and 21 of this capacitor are mounted on the interior wall of the tube 10, or embedded therein, plate 20 being mounted in the upper portion of the tube and plate 21 being mounted in the lower portion. A cap 22 covers the upper end of the tube 10 and has attached thereto one end of a spring 24, the other end of which is fastened to a pin 26 mounted in sleeve 16 near its lower end. This spring 24 acts to urge the sleeve 16 toward the upper end of the tube 10. The lower end of sleeve 16 is provided with a check valve comprising a seat 28 and a ball 30.

This check valve cooperates with a damping fluid 32 which fills the tube 10 and permits the sleeve 16 to be moved downwardly in the tube 10 with relative ease, but retards its upward movement under the force of spring 24. Highly purified nitrobenzene has been found to be one satisfactory damping fluid for this purpose. An arrow, bar, line or other suitable indicating marker 34 is formed on the outer periphery of the sleeve 16 and cooperates with a temperature scale 36 formed on the upper portion of the tube 10. The capacitor plates 20 and 21 are made to cover less than 360 degrees so that the indicating marker 34 is visible.

The tube 10 is provided with an elongated raised portion 38. In the elongated raised portion 38 there is formed a first longitudinal slot or passageway 40 that extends along the length of the portion 38 and a perpendicular slot 42 which communicates with the slot 40 and also with the interior of the tube 10. A suitable friction latch 44 is formed by a leaf spring attached to the portion 38 and biased into engagement with the sleeve 16 by its own compression. A set screw 46 is provided for controlling the latch tension.

An unlocking bar 48 is slideably mounted in the slot 40 and serves to deflect the latch 44 away from the sleeve 16 when it is fully inserted into the slot 40. A flexible membrane 49 bonded across the lower end of the slot 40 seals the interior volume of the tube containing the fluid 32. The bar 48 acts on the latch 44 through the membrane 49. Movement of the unlocking bar 48 in the slot 40 is controlled by a push button 50 which is slideably mounted over an enlarged portion 54 of the tube 10. The push button 50 is provided with an extension 56 for engaging the upper end of the unlocking bar 48. A spring 58 is seated on the end of the enlarged portion 54 and biases the push button 50 away from this enlarged portion. A pin 60 limits the movement of the push button 50.

A coil 62 is provided in the interior of the upper portion of the tube 10 and has an armature 64 which is hingedly mounted on a pin 65. A lever 66 is mounted on the armature 64 and cooperates with an annular groove 67 formed in the unlocking bar near its upper end 48 to prevent movement of the unlocking bar 48 when the lever is held against movement in the groove.

One or more batteries 68 are provided for supplying electrical energy to the coil 62 and to the circuitry 70 (to be later described in connection with FIGURE 3) to which the two sensing capacitors 12 and 13 are connected by means of the leads 14; the sleeve 16 by means of leads 72, the spring 24 and the pin 26; and the plates 20 and 21 by leads 73 which may be embedded in the walls of the tube 10. A cap 74 is threadedly engaged with the upper end of the push button 50 to maintain the batteries in position and to permit access to them and to the circuitry when such is needed. It should be noted that the cap serves as a part of the circuit connecting one terminal of the battery 68 to the circuitry 70 so that a circuit is broken when the cap is removed.

The batteries 68 are connected to the circuitry 70 by a flexible wire 75 on one side and by an extension 76 of the push button 50, which extension is insulated from the remainder of the push button by a plastic sleeve 77. When the push button 50 is depressed, the extension 76 engages the armature 64 which is part of the circuit to the coil 62, thus closing this circuit and energizing the coil. The armature 64 is also provided with a finger contact 78 which is drawn down into engagement with the extension 76 as the armature moves toward the coil 62. This finger contact 78 continues to engage the extension 76 after the push button 50 is released and thus the circuit remains complete.

The operation of the above described clinical thermometer is as follows. When a patient's temperature is to be taken, the thermometer is shaken so that the sleeve 16 travels toward the sensing end of the tube 10. If desired, a manually operated push rod may be provided to cause this sleeve movement. The check valve operates to permit easy movement of the sleeve 16 in this direction through the damping fluid 32 and the frictional engagement of the latch 44 is insufficient to prevent movement of the sleeve 16 against such a sharp shake. When the sleeve 16 has reached the end of the tube 10, the force exerted by the latch 44 will be sufficient to prevent the return of the sleeve 16 by action of the spring 24.

The sensing end of the thermometer is now positioned in the desired body orifice and the ferroelectric capacitors 12 and 13 assume capacitances corresponding to the body temperature at that point. The push button 50 is now depressed with the result that the coil 62 and circuitry 70 are energized and the unlocking bar 48 deflects the latch 44 away from the sleeve 16. The unlocking bar 48 and latch 44 are held in this position by the insertion of the lever 66 into the groove 67 of the unlocking bar 48. The lever 66 is maintained in this position by the action of the energized coil 62 on the armature 64. The push button 50 is returned to its initial position by the spring 58.

The sleeve 16 now begins to move upwardly in the tube 10 under the force exerted by the spring 24, and against the damping action of the fluid 32. The circuitry 70 can comprise any suitable electrical circuit which senses a balance or equality between the values of the two electrical capacitors 12 and 13 and the variable plate, split-stator capacitor 18 of which the sleeve 16 forms one plate.

When, because of the movement of the sleeve 16, these capacitive values are balanced, the circuitry 70 produces an output signal which de-energizes the coil 62. The magnetic field generated by the coil 62 which held the armature 64 closed against the force of the leaf spring latch 44 is thus terminated. The latch 44 now flexes and causes the unlocking bar 48 to move upwardly. Movement of the unlocking bar 48 causes the lever 66 to be cammed out of the groove 67 and the armature 64 and finger contact 78 to be pivoted away from the coil 62 and extension 76 respectively, thus breaking the electrical circuit. The latch 44 re-engages the sleeve 16 and this frictional engagement prevents further movement of this sleeve. An accurate temperature reading can now be made by means of the indicating marker 34 and the temperature scale 36.

Referring now to FIGURE 3, there is shown a circuit that is suitable for use in the thermometer of the present invention. It should be understood that this is merely illustrative and that any other circuit that will produce an output in response to the balance of the values of a plurality of capacitors could equally well be used. In the illustrated circuit an oscillator indicated generally by the reference numeral 80 includes a transistor 82 and a bridge circuit 84. The bridge circuit 84 includes the ferroelectric capacitors 12 and 13 and the two sections of the variable plate, split-stator capacitor 18 corresponding to the plates 20 and 21, as well as a center taped inductance coil 86. The output of the oscillator 80 is connected through coupling capacitors 90 to the base of a drive transistor 92 which is connected in series with the coil 62. The transistor 92 is biased to conduct by means of resistors 94 and 95, and diodes 96 are provided so that only the positive excursions of the oscillator output appear at the base of the transistor 92.

In operation, when the sleeve 16 is shaken down into the bottom of the tube 10, the values of the ferroelectric capacitors 12 and 13 are unequal and all of the capacitance of the split-stator capacitor 18 is in the lower section 21, therefore, the output of the bridge 86 is not of the proper polarity to cause oscillation of the oscillator 80. As the sleeve 16 moves upwardly, the value of the capacitor 20 increases and that of capacitor 21 decreases until they balance the values of capacitors 12 and 13 which correspond to the temperature being measured.

At this point, the output of the bridge 86 is of the proper polarity to cause oscillation of the oscillator 80. The output of the oscillator 80 is coupled to the drive transistor 92 where it causes it to shift to Class C bias, reducing the current caused by the fixed bias to a value insufficient to energize the coil 62. The hinged armature 64 is thus released and the unlocking bar 48 is pushed upwardly by the leaf spring latch 44 as it relaxes with the result described previously.

As can be seen from the foregoing description the present invention provides a clinical thermometer which is almost instantaneous in operation, extremly accurate, easy to read, and which can be made from unbreakable material such as suitable plastics. The thermometer functions and indicates in the same manner as those previously used and thus the user need learn no new techniques or procedures. Although the invention has been described in connection with a clinical thermometer, it should be obvious that the principle of the invention can also be applied to any other equivalent situation where it is desired to obtain a rapid and accurate temperature measurement. It should also be apparent to those skilled in the art that other electrical elements such as resistors or inductors could be used in place of the illustrated capacitors in a suitable bridge circuit within the scope of the present invention.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A device for making temperature measurements comprising a hollow tube, means positioned at one end of said tube and having an electrical characteristic variable in response to variations in temperature adjacent thereto, means mounted in said tube and having a variable electrical characteristic, at least a portion of said mounted means being movable in said tube to vary its electrical characteristic, means connected to said temperature responsive means and to said mounted means for monitoring said varying electrical characteristics, and means actuable by said monitoring means to prevent movement of said movable portion when the electrical characteristic of said mounted means is in balance with the electrical characteristic of said temperature responsive means.

2. A device for making temperature measurements comprising a hollow tube, a temperature sensitive capacitor positioned at one end of said tube, a variable plate capacitor mounted in said tube, one of the plates of said variable plate capacitor being movable along the length of said tube to vary its capacitance, means connected to said temperature sensitive capacitor and to said variable plate capacitor for monitoring their respective capacitances, and means actuable by said monitoring means to prevent movement of said movable plate when the capacitance of said variable plate capacitor is in balance with the capacitance of said temperature sensitive capacitor.

3. A device for making temperature measurements comprising a hollow tube, a temperature sensitive capacitor positioned at one end of said tube, a variable plate capacitor mounted in said tube, one of the plates of said variable plate capacitor being movable along the length of said tube to vary its capacitance, means for moving said movable plate in one direction along the length of said tube, means movable into engagement with said movable plate to prevent its movement by said moving means, means electrically coupled to said temperature sensitive capacitor and said variable plate capacitor for monitoring their respective capacitances, and means responsive to said monitoring means for permitting movement of said movable means into engagement with said plate when the capacitance of said variable plate capacitor is in balance with the capacitance of said temperature sensitive capacitor.

4. A thermometer comprising a hollow tube, a temperature sensitive capacitor positioned at one end of said tube, a coaxial, split-stator, variable plate capacitor mounted in said tube, one of the plates of said variable plate capacitor being movable along the length of said tube, to vary its capacitance, means for moving said plate in one direction along the length of said tube, means in said tube for opposing movement of said plate in said one direction, means movable into engagement with said plate to prevent its movement by said moving means, means electrically coupled to said temperature sensitive capacitor and said variable plate capacitor for producing an output signal when their respective capacitances are in balance, and means coupled to said output signal producing means and responsive to said output signal for permitting movement of said movable means into engagement with said plate.

5. The thermometer of claim 4 wherein said movement opposing means in said tube comprises a body of damping fluid and said movable plate is provided with a check valve to provide easy movement of said plate in the direction opposite to said first direction.

6. A thermometer comprising a hollow tube, means positioned at one end of said tube and having an electrical characteristic variable in response to variations in temperature adjacent thereto, means mounted in said tube and having a variable electrical characteristic, at least a portion of said mounted means being movable in said tube to vary said electrical characteristic, means for moving said portion of said mounted means in one direction along the length of said tube, means in said tube for opposing movement of said portion in said one direction, means movable into engagement with said portion to prevent its movement by said moving means, means electrically coupled to said temperature responsive means and said mounted means for producing an output signal when their respective characteristics are in balance, and means coupled to said output signal producing means and responsive to said output signal for permitting movement of said movable means into engagement with said movable portion of said mounted means.

7. The thermometer of claim 6 wherein said movement opposing means in said tube comprises a body of damping fluid and said portion of said mounted means is provided with a check valve to provide easy movement of said portion in the direction opposite to said first direction.

8. A thermometer comprising a hollow tube, a pair of ferroelectric capacitors positioned at one end of said tube, a coaxial, split-stator, variable plate capacitor mounted in said tube, one of the plates of said variable plate capacitor being movable along the length of said tube to vary its capacitance, a spring mounted in said tube and connected to said movable plate for moving said movable plate away from said one end, means in said tube for opposing movement of said plate away from said one end, latch means movable into engagement with said plate to prevent its movement under the force of said spring, means electrically coupled to said ferroelectric capacitors and said split-stator, variable plate capacitor for producing an output signal when their various capacitances are in balance, locking means operable to prevent engagement of said latch means with said plate, and means coupled to said output signal producing means and responsive to said output signal for releasing said locking means whereby said latch means engages said plate.

9. A thermometer comprising a hollow tube, first and second means positioned at one end of said tube and having electrical characteristics variable in response to variations in temperature adjacent thereto, third and fourth means mounted in said tube and having variable electrical characteristics, means movably mounted in said tube, said movably mounted means cooperating with said third and fourth means to vary the electrical characteristics thereof, a spring mounted in said tube and connected to said movable means for moving said movable means away from said one end, a body of damping fluid positioned in said tube, a check valve mounted on said movable means, said check valve being operative to facilitate movement of said movable means toward said one end and to oppose movement of said movable means away from said one end, latch means engageable with said movable means to prevent the movement thereof under the force of said spring, said latch means being normally urged into engagement with said movable means, means electrically coupled to said first, second, third and fourth means for producing an output signal when their various electrical characteristics are in balance, locking means operable to prevent engagement of said latch means with said movable means, and means coupled to said output signal producing means and responsive to said output signal for releasing said locking means whereby said latch means engages said movable means.

10. The thermometer of claim 9 wherein said output signal responsive means includes a coil and an armature responsive to de-energization of said coil to permit release of said locking means.

11. The thermometer of claim 9 wherein said tube is transparent and provided with a temperature scale marked thereon, and said movable means is provided with an indicating means for cooperating with said scale.

12. A thermometer comprising a hollow tube, a pair of ferroelectric capacitors positioned at one end of said tube, a coaxial, split-stator, variable plate capacitor mounted in said tube, one of the plates of said variable plate capacitor being movable along the length of said tube to vary its capacitance, the split stator plates being positioned in different portions of said tube, a spring mounted in said tube and connected to said movable plate for moving said movable plate away from said one end, a body of damping fluid positioned in said tube, a check valve mounted on said plate, said check valve being operable to facilitate movement of said plate toward said one end and to oppose movement of said plate away from said one end, latch means engageable with said plate to prevent the movement thereof under the force of said spring, said latch means being normally urged into engagement with said plate, means electrically coupled to said ferroelectric capacitors and said split-stator, variable plate capacitor for producing an output signal when their various capacitances are in balance, locking means operable to prevent engagement of said latch means with said plate, and means coupled to said output signal producing means and responsive to said output signal for releasing said locking means whereby said latch means engages said plate.

13. The thermometer of claim 12 wherein said output signal responsive means includes a coil and an armature responsive to de-energization of said coil to permit release of said locking means.

14. The thermometer of claim 12 wherein said tube is transparent and provided with a temperature scale marked thereon, and said movable plate is provided with an indicating means for cooperating with said scale.

15. A clinical thermometer comprising a hollow tube, first and second means positioned at one end of said tube and having electrical characteristics variable in response to variations in temperature adjacent thereto, third and fourth means mounted in different portions of said tube and having variable electrical characteristics, means movably mounted in said tube, said movably mounted means cooperating with said third and fourth means to vary the electrical characteristics thereof, a spring mounted in said tube and connected to said movable means for moving said movable means away from said one end, a body of damping fluid positioned in said tube, a check valve mounted on said movable means, said check valve being operable to facilitate movement of said movable means toward said one end and to oppose movement of said movable means away from said one end, latch means mounted in said tube and engageable with said movable means to prevent its movement under the force of said spring, said latch means being normally urged into engagement with said movable means, electrical circuit means coupled to said first, second, third and fourth means, said electrical circuit means producing an output signal when the electrical characteristics of said first, second, third and fourth means are in balance, a coil coupled to said electrical circuit means and de-energizable in response to said output signal, an armature movable from a first position to a second position upon energization of said coil, said armature normally being positioned in said first position, a push button slideably mounted on the other end of said tube, depression of said push button causing said coil to be energized and said armature to move from said first position to said second position, a member slideably mounted in a portion of said tube, said member being operable by said push button when said push button is depressed to disengage said latch means from said movable means, said armature having a lever mounted thereon, said lever being operative when said armature is in said second position to lock said member in its latch means disengaging position, whereby de-energization of said coil permits said latch means to be urged into engagement with said movable means and prevent further movement of said movable means.

16. The thermometer of claim 15 wherein said tube is transparent and provided with a temperature scale marked thereon, and said movable means is provided with an indicating means for cooperating with said scale.

17. A clinical thermometer comprising a hollow tube, a pair of ferroelectric capacitors positioned at one end of said tube, a coaxial, split-stator, variable plate capacitor mounted in said tube, one of the plates of said split-stator, variable plate capacitor being movable along the length of said tube to vary its capacitance, the split stator plates being positioned in different portions of said tube, a spring mounted in said tube and connected to said movable plate for moving said movable plate away from said one end, a body of damping fluid positioned in said tube, a check valve mounted on said movable plate, said check valve being operable to facilitate movement of said movable plate toward said one end and to oppose movement of said movable plate away from said one end, latch means mounted in said tube and engageable with said movable plate to prevent its movement under the force of said spring, said latch means being normally urged into engagement with said movable plate, electrical circuit means coupled to said ferroelectric capacitors and said split-stator, variable plate capacitor, said electrical circuit means producing an output signal when the various capacitances of the capacitors are in balance, a coil coupled to said electrical circuit means and de-energizable in response to said output signal, an armature movable from a first position to a second position upon energization of said coil, said armature normally being positioned in said first position, a push button slideably mounted on the other end of said tube, depression of said push button causing said coil to be energized and said armature to move from said first position to said second position, a member slideably mounted in a portion of said tube, said member being operable by said push button when said push button is depressed to disengage said latch means from said movable plate, said armature having a lever mounted thereon, said lever being operative when said armature is in said second position to lock said member in its latch means disengaging position, whereby de-energization of said coil permits said latch means to be urged into engagement with said movable plate and prevent further movement of said movable plate.

18. The thermometer of claim 17 wherein said tube is transparent and provided with a temperature scale marked thereon, and said movable plate is provided with an indicating means for cooperating with said scale.

References Cited by the Examiner

UNITED STATES PATENTS

| | | | |
|---|---|---|---|
| 3,136,161 | 6/1964 | Calvert | 73—362 |
| 3,190,122 | 6/1965 | Edwards | 73—362 |

LOUIS R. PRINCE, *Primary Examiner.*

D. McGIEHAN, *Assistant Examiner.*